US010224529B2

(12) United States Patent
Zeng et al.

(10) Patent No.: US 10,224,529 B2
(45) Date of Patent: Mar. 5, 2019

(54) STACKED-ELECTRODE BATTERY CELL

(71) Applicant: Microsoft Technology Licensing, LLC, Redmond, WA (US)

(72) Inventors: Dongli Zeng, Fremont, CA (US); Tzu-Yuan Lin, San Jose, CA (US); Vijayasekaran Boovaragavan, Cupertino, CA (US); John Christopher Collins, San Jose, CA (US); Michael Nikkhoo, Saratoga, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 180 days.

(21) Appl. No.: 15/242,422

(22) Filed: Aug. 19, 2016

(65) Prior Publication Data

US 2018/0053927 A1 Feb. 22, 2018

(51) Int. Cl.
| | | |
|---|---|---|
| *H01M 2/00* | (2006.01) | |
| *H01M 2/26* | (2006.01) | |
| *H01M 2/06* | (2006.01) | |
| *B23K 20/10* | (2006.01) | |
| *H01M 10/0525* | (2010.01) | |
| *H01M 10/0585* | (2010.01) | |
| *B23K 101/36* | (2006.01) | |

(52) U.S. Cl.
CPC .............. *H01M 2/26* (2013.01); *B23K 20/10* (2013.01); *H01M 2/06* (2013.01); *H01M 2/266* (2013.01); *H01M 10/0525* (2013.01); *H01M 10/0585* (2013.01); *B23K 2101/36* (2018.08)

(58) Field of Classification Search
CPC ...... H01M 2/26; H01M 2/06; H01M 10/0585; H01M 2/266; H01M 10/0525; B23K 20/10
See application file for complete search history.

(56) References Cited

U.S. PATENT DOCUMENTS

| | | |
|---|---|---|
| 7,511,456 B2 | 3/2009 | Lee et al. |
| 8,021,775 B2 | 9/2011 | Kaun |
| (Continued) | | |

FOREIGN PATENT DOCUMENTS

EP    2608292 A2    6/2013

OTHER PUBLICATIONS

"International Search Report and Written Opinion Issued in PCT Application No. PCT/US2017/047237", dated Nov. 28, 2017, 10 Pages.

(Continued)

*Primary Examiner* — Cynthia H Kelly
*Assistant Examiner* — Monique M Wills
(74) *Attorney, Agent, or Firm* — Arent Fox LLP

(57) ABSTRACT

Disclosed are a stacked-electrode battery cell that has offset electrode-to-terminal bonds, and a method for manufacturing such a cell. The stacked-electrode battery cell can comprise an external connection terminal that includes a flat tab, and a plurality of flat electrodes stacked along a first coordinate axis and collectively forming at least a portion of an anode or a cathode of the battery cell. A first electrode of the plurality of flat electrodes is bonded to a first bond region of the tab and a second electrode of the plurality of flat electrodes is bonded to a second bond region of the tab, where the first bond region and the second bond region are non-overlapping along at least one coordinate axis perpendicular to the first coordinate axis.

20 Claims, 4 Drawing Sheets

(56) References Cited

U.S. PATENT DOCUMENTS

| | | |
|---|---|---|
| 8,192,888 B2 | 6/2012 | Day et al. |
| 9,160,039 B2 | 10/2015 | Yoon et al. |
| 2004/0161669 A1 | 8/2004 | Zolotnik et al. |
| 2006/0108335 A1 | 5/2006 | Zhao et al. |
| 2008/0060189 A1 | 3/2008 | Daidoji et al. |
| 2010/0330422 A1 | 12/2010 | Kim et al. |
| 2013/0171485 A1* | 7/2013 | Kodera ................ H01M 2/204 429/90 |
| 2014/0329126 A1 | 11/2014 | Ho et al. |

OTHER PUBLICATIONS

Massey, Steve, "Ultrasonic Metal Welding for Lithium-Ion Battery Cells", Published on: Jan. 17, 2013, Available at: https://ewi.org/ultrasonic-metal-welding-for-lithium-ion-battery-cells/.

* cited by examiner

STACKED-ELECTRODE BATTERY CELL

BACKGROUND

In the design of certain types of battery cells, particularly but not exclusively Lithium-ion ("Li-ion") cells, two design approaches are commonly used. One approach is a so-called "jelly roll" design, which involves rolling two thin metal sheets that form the anode and cathode electrodes, respectively, about a spindle or mandrel, to form multiple layers of both anode and cathode. The other approach is a so-called stacked design, in which the anode and cathode are each formed of physically distinct thin metal sheets, which are stacked on top of one another to form multiple layers of both anode and cathode. The individual electrode layers, or "substrates," are normally separated by a coating on each layer and/or by other insulative material placed between the electrode layers.

In a stacked design, the individual electrode substrates are typically welded to a thin metal tab that, when the battery is fully assembled, protrudes from the battery package to form an external connection terminal of the battery. One such tab forms the anode terminal of the battery cell and another such tab forms the cathode terminal of the battery cell. Ultrasonic welding is commonly used to bond the substrates to their respective tabs.

SUMMARY

The technique introduced here includes a stacked-electrode battery cell that has offset electrode-to-terminal bonds, and a method for manufacturing such a cell. In certain embodiments introduced here, a stacked-electrode battery cell comprises an external connection terminal that includes a flat tab, and a plurality of flat electrodes stacked along a first coordinate axis and collectively forming at least a portion of an anode or a cathode of the battery cell. A first electrode of the plurality of flat electrodes is bonded to a first bond region of the tab and a second electrode of the plurality of flat electrodes is bonded to a second bond region of the tab, where the first bond region and the second bond region are non-overlapping (offset) along at least one coordinate axis perpendicular to the first coordinate axis. This approach may be separately employed for the anode and cathode electrodes in a stacked-electrode battery cell.

Other aspects of the technique will be apparent from the accompanying figures and detailed description.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Certain product applications may require a thicker stacked-electrode battery cell than other applications. For example, due to space constraints of the product in which the battery cells will be used, it may be preferable to have a smaller number of thicker cells rather than a larger number of thinner cells. A thicker stacked-electrode battery cell normally includes more anode layers and more cathode layers than a thinner design. However, ultrasonic welding, which is commonly used to bond the stacked electrodes to their external contact tabs, tends to lose its effectiveness as the number of layers (and therefore the thickness of material) increases beyond a certain point. Introduced below, therefore, is a technique which addresses this challenge.

Figure 1:
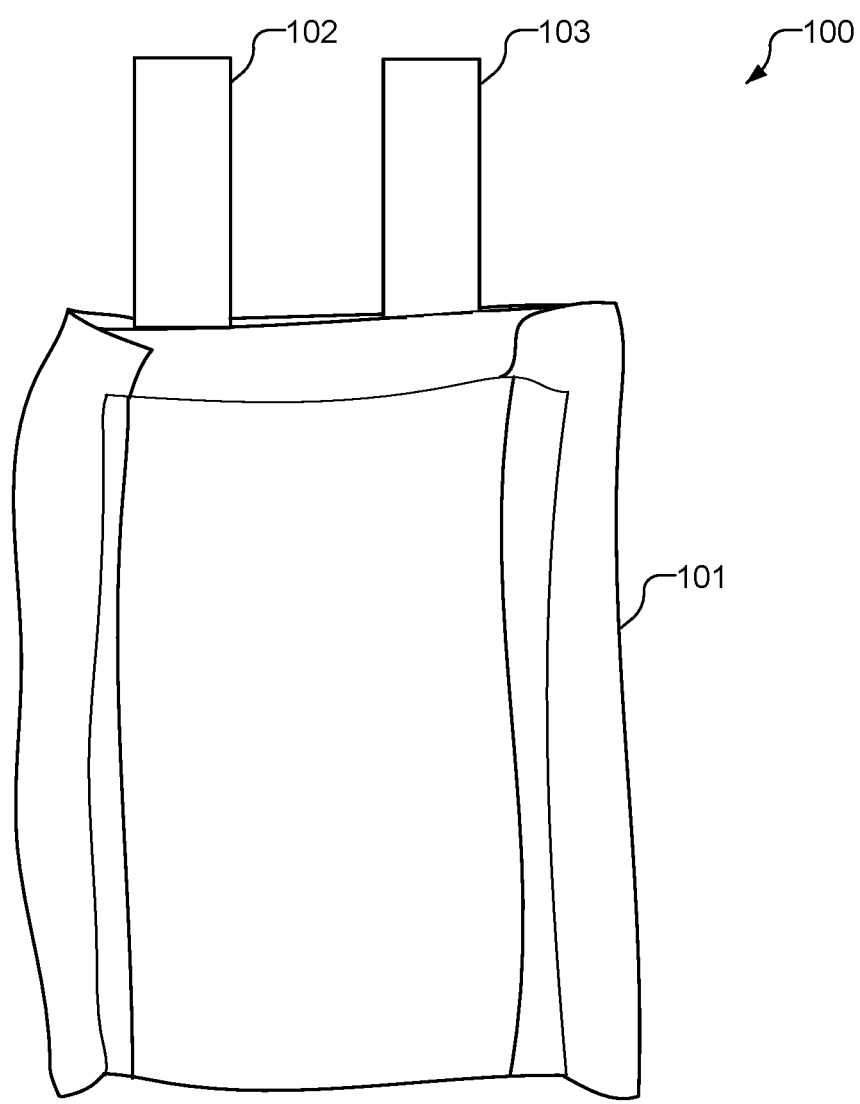
FIG. 1 illustrates an example of a top exterior view of a Li-ion battery cell.

FIG. 1 shows an example of a top exterior view of a Li-ion battery cell. The battery cell 100 in FIG. 1 includes an outer wrapper 101 typically made of a thin, flexible and durable non-conductive material (e.g., plastic or polymer or laminated metal foil). Two thin-sheet metal tabs 102 and 103 protrude from the interior of the cell and form the anode and cathode electrodes, respectively. Though not shown in FIG. 1, each of the tabs 102 and 103 is bonded (e.g., welded) within the interior of the wrapper 101 to all of the anode layers or to all of the cathode layers.

Figure 2A:
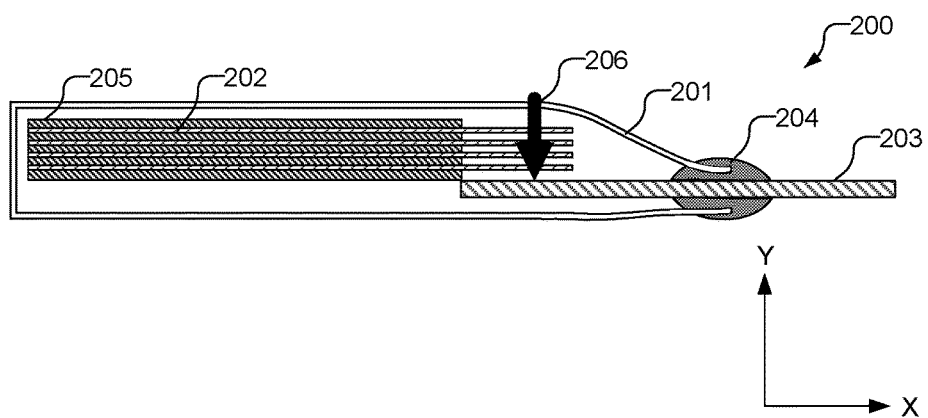
FIG. 2A is a side cross-sectional side view of a stacked-electrode Li-ion battery cell according to one design approach.
Figure 2B:
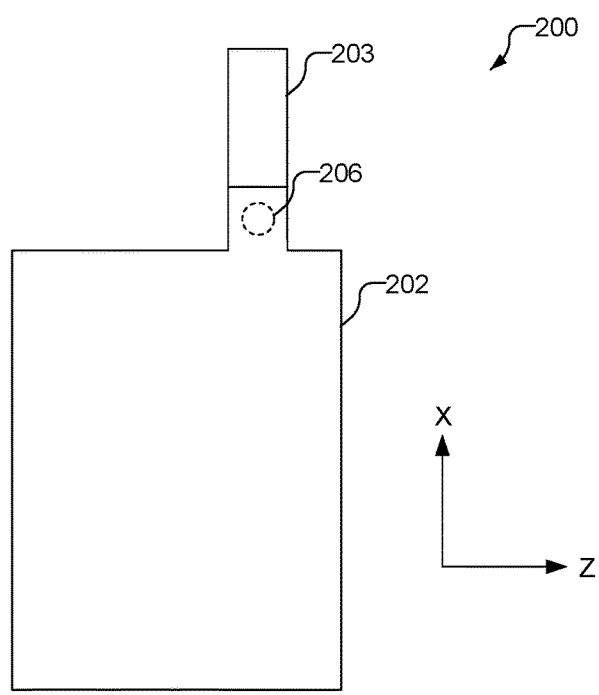
FIG. 2B is a top internal view of the stacked-electrode Li-ion battery cell of FIG. 2A.

FIGS. 2A and 2B show internal features of a stacked-electrode Li-ion battery cell according to a particular design approach that has shortcomings overcome by the technique discussed below. More specifically, FIG. 2A is a side cross-sectional side view of the stacked-electrode Li-ion battery cell 200 showing its internal features. Multiple layers (substrates) 202 of an electrode (either anode or cathode) are contained within a wrapper 201 (which is omitted from FIG. 2B to simplify illustration). The electrode layers 202 are disposed proximate to a flat tab 203 that forms an external electrical connection terminal (anode or cathode terminal) of the battery cell. To simplify illustration, only one multi-layer electrode and corresponding tab are shown, which can be either the anode or the cathode; however, it shall be understood that the cell 200 includes both a multi-layer anode and a multi-layer cathode and corresponding tabs arranged as shown. The substrates 202 may be separated by insulative coatings or separation layers 205 as shown. The wrapper 201 is sealed and affixed to the tabs 203 by a sealant 204, which can be any known or convenient type of sealant, such as polymer sealant. FIG. 2B is a top internal view of the battery cell 200 of FIG. 2A. Note that FIG. 2B is not necessarily drawn to the same scale as FIG. 3A.

In the design approach represented in FIGS. 2A and 2B, all of the substrates 202 of a given electrode (anode or cathode) are welded to the same location 206 on the electrode tab 203 as viewed in the x-z plane (i.e., from a view direction parallel to the y-axis). This design presents a challenge for applications that require a thicker battery cell. Specifically, ultrasonic welding and other bonding techniques tend to lose their effectiveness as the number of electrode layers increases.

Figure 3A:
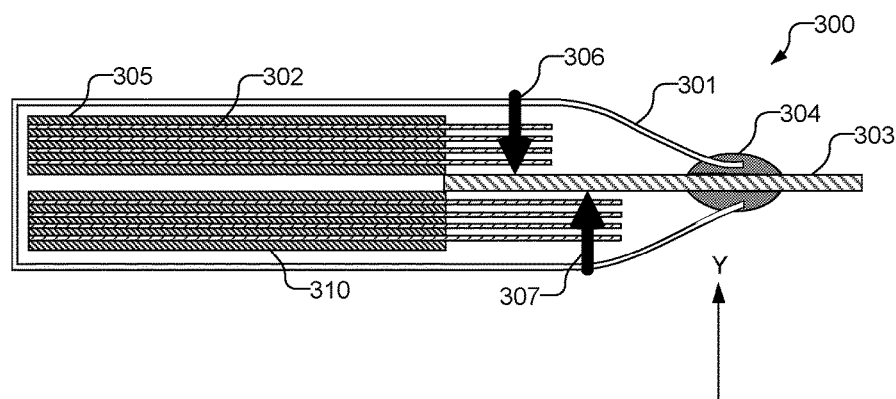
FIG. 3A is a side cross-sectional side view of a stacked-electrode battery cell with offset electrode-to-terminal bonds.
Figure 3B:
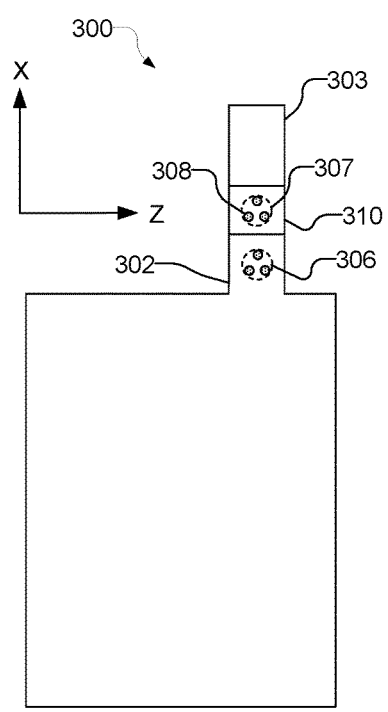
FIG. 3B is a top internal view of the stacked-electrode battery cell of FIG. 3A, according to a first embodiment.
Figure 3C:
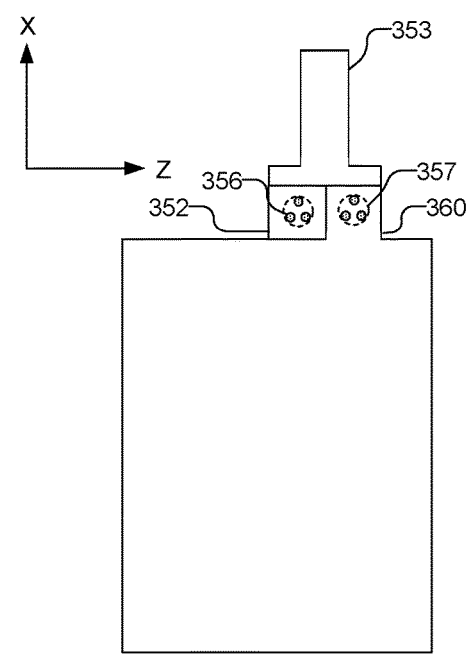
FIG. 3C is a top internal view of a stacked-electrode battery cell, according to a second embodiment.

FIGS. 3A through 3C illustrate a stacked-electrode battery cell design that addresses this challenge. In particular, FIGS. 3A through 3C show a stacked-electrode battery cell that has offset electrode-to-terminal bonds for a given electrode, i.e., anode or cathode. Because at least some of the electrode-to-terminal bonds are offset for different layers of the same electrode, the total thickness of materials to be welded is kept small, thereby allowing a greater number of layers to be used for each electrode for a given type bonding technique. Note that FIGS. 3B and 3C are not necessarily drawn to the same scale as FIG. 3A.

FIG. 3A is a side cross-sectional side view of the stacked-electrode battery cell 300 showing its internal features. The cell 300 can be, for example, a Li-ion cell, although the illustrated technique can also be applied to other types of stacked-electrode cells. Multiple layers (substrates) 302 of an electrode (anode or cathode) are contained within a wrapper 301. The electrode layers 302 are disposed proximate to a flat tab 303 that forms an external electrical connection terminal (anode or cathode terminal) of the battery cell. To simplify illustration, only one multi-layer electrode and corresponding electrode tab are shown, although it shall be understood that the cell includes both a multi-layer anode and a multi-layer cathode and corresponding tabs arranged as shown. The substrates 302 may be separated by insulative coatings or separation layers 305 as shown. The wrapper 301 is sealed and affixed to the tabs 303 by a sealant 304, which can be any form of known sealant, such as polymer sealant.

In the design approach represented in FIGS. 3A and 3B, one or more substrates 302 of a given electrode (anode or cathode) are welded to one region ("bond region") 306 on the electrode tab 303 as viewed in the x-z plane (i.e., from a view direction parallel to the y-axis), while one or more other substrates 310 of that same electrode are welded to a different bond region 307 on the electrode tab 303 as viewed in the x-z plane.

FIG. 3B shows how two bond regions 306 and 307 for a given electrode (anode or cathode) can be offset along the z-axis. It can be seen that the bond regions 306 and 307 for the illustrated electrode do not overlap along either the x-axis or the z-axis. A given bond site may include a single contact point or multiple contact points 308, depending on the type and design of the bonding equipment used (e.g., the sonotrode in the case of ultrasonic welding). Hence, the term "bond region" as used herein refers to the smallest region that encloses all of the contact points produced at one time by a single weld head (e.g., sonotrode) or the like.

FIG. 3C illustrates an alternative embodiment in which two bond regions 356 and 357 for a given electrode (anode or cathode) are offset along the z-axis. One or more substrates 352 of a given electrode (anode or cathode) are welded to one region ("bond region") 356 on the electrode tab 353 as viewed in the x-z plane (i.e., from a view direction parallel to the y-axis), while one or more other substrates 360 of that same electrode are welded to a different bond region 307 on the electrode tab 303 as viewed in the x-z plane. In some embodiments, there may be more than two substrate-to-tab bond regions for a given electrode (anode or cathode), to further distribute the welds among a greater number of electrode layers and thereby enable a greater number of total layers to be used. Further, in some embodiments there may be two or more tabs for each of the anode or electrode. In some embodiments, two or more welds for a given electrode may be offset along both the x-axis and the z-axis. Additionally, the number and spatial relationships of the contact points 308 at a given bond site may be selected to provide optimal bond strength and/or optimal spacing between bond sites. For example, a configuration of three contact points arranged in a triangular pattern such as shown in FIGS. 3B and 3C may be considered preferable for at least some embodiments. The bonding equipment (e.g., sonotrode) can be designed to produce the desired pattern.

Note that while the technique introduced here is described in the context of welding for the substrate-to-tab bonds, other types of bonds could be used instead or in addition to welds, such as solder bonds. Further, to the extent welding is used, other types of welds can be used instead of or in addition to ultrasonic welds, such as resistance welds, laser welds, etc. In some embodiments, the anode substrates may be made of copper and coated with graphite slurry, for example, while the cathode substrates are made of Al coated with $LiCoO_2$ slurry. In such embodiments, the electrode tabs may be made of Al, Ni or Ni-coated Cu, for example.

Figure 4:
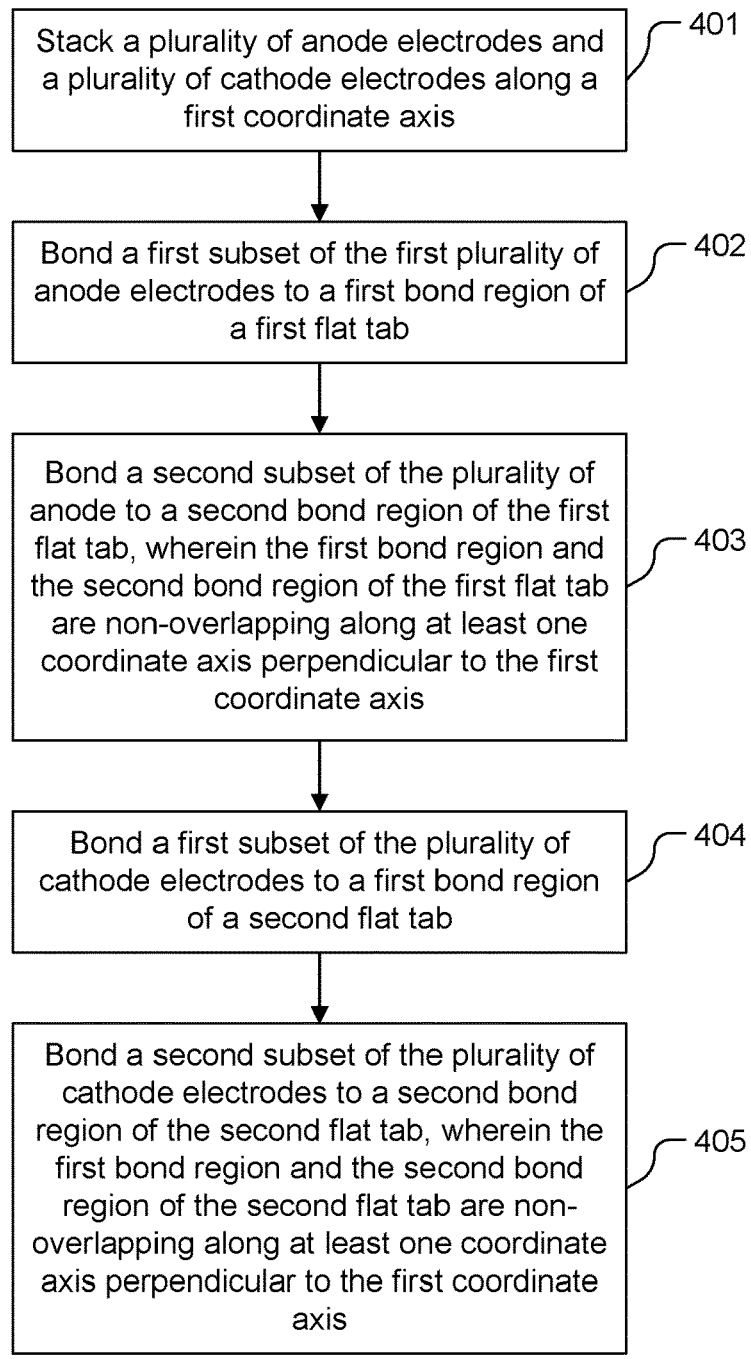
FIG. 4 is a flow diagram showing an example of a process of manufacturing a stacked-electrode battery cell with offset electrode-to-terminal bonds.

FIG. 4 shows an example of a process of manufacturing a stacked-electrode battery cell with offset electrode-to-terminal bonds such as described above. At step 501, a plurality of anode electrodes and a plurality of cathode electrodes are stacked along a first coordinate axis, such as the y axis in FIGS. 3A through 3C. At step 402, a first subset of the plurality of anode electrodes is bonded to a first bond region of a first flat tab. At step 403, a second subset of the plurality of anode electrodes is bonded to a second bond region of the first flat tab, wherein the first bond region and the second bond region of the first flat tab are non-overlapping along at least one coordinate axis perpendicular to the first coordinate axis. At step 404, a first subset of the plurality of cathode electrodes is bonded to a first bond region of a second flat tab. At step 405, a second subset of the plurality of cathode electrodes is bonded to a second bond region of the second flat tab, wherein the first bond region and the second bond region of the second flat tab are non-overlapping along at least one coordinate axis perpendicular to the first coordinate axis.

Examples of Certain Embodiments

Certain embodiments of the technology introduced herein are summarized in the following numbered examples:

1. A stacked-electrode battery cell comprising: an external connection terminal including a flat tab; and a plurality of flat electrodes stacked along a first coordinate axis, all of the electrodes collectively forming at least a portion of only one of an anode or a cathode of the battery cell, wherein a first electrode of the plurality of flat electrodes is bonded to a first bond region of the tab and a second electrode of the plurality of flat electrodes is bonded to a second bond region of the tab, and wherein the first bond region and the second bond region are non-overlapping along at least one coordinate axis perpendicular to the first coordinate axis.

2. The method of example 1, wherein the first bond region and the second bond region are non-overlapping along a second coordinate axis parallel to a length of the tab and perpendicular to the first coordinate axis.

3. The method of example 1 or example 2, wherein the first bond region and the second bond region are non-overlapping along a second coordinate axis perpendicular to a length of the tab and perpendicular to the first coordinate axis.

4. The method of any of examples 1 through 3, wherein the first bond region and the second bond region are non-overlapping along a plurality of coordinate axes perpendicular to the first coordinate axis.

5. The method of any of examples 1 through 4, wherein the stacked electrode battery cell is a lithium-ion battery cell.

6. The method of any of examples 1 through 5, wherein the first and second electrodes are bonded to the tab by an ultrasonic weld.

7. The method of any of examples 1 through 6, wherein the tab is elongate in a direction in which the first bond region and the second bond region do not overlap.

8. A stacked-electrode battery cell comprising: a first external anode connection terminal including a flat anode tab; a second external cathode connection terminal including a flat cathode tab; a plurality of flat anode electrodes stacked along a first coordinate axis, the plurality of flat anode electrodes collectively forming at least a portion of an anode of the battery cell, wherein a first anode electrode of the plurality of flat anode electrodes is bonded to a first bond region of the anode tab and a second anode electrode of the plurality of flat anode electrodes is bonded to a second bond region of the anode tab, and wherein the first bond region and the second bond region of the anode tab are non-overlapping along at least one coordinate axis perpendicular to the first coordinate axis; a plurality of flat cathode electrodes stacked along the first coordinate axis, the plurality of flat cathode electrodes collectively forming at least a portion of a cathode of the battery cell, wherein a first cathode electrode of the plurality of flat cathode electrodes is bonded to a first bond region of the cathode tab and a second cathode electrode of the plurality of flat cathode electrodes is bonded to a second bond region of the cathode tab, and wherein the first bond region and the second bond region of the cathode tab are non-overlapping along at least one coordinate axis perpendicular to the first coordinate axis; an exterior enclosure enclosing the plurality of anode electrodes, the plurality of anode electrodes, and a portion of each of the anode tab and the cathode tab; and an electrolytic compound contained within the enclosure and immersing the plurality of anode electrodes and the plurality of anode electrodes.

9. The stacked-electrode battery cell of example 8, wherein the first bond region and the second bond region of at least one of the anode tab or the cathode tab are non-overlapping along a second coordinate axis parallel to a length of the anode tab and perpendicular to the first coordinate axis.

10. The stacked-electrode battery cell of example 8 or example 9, wherein the first bond region and the second bond region of at least one of the anode tab or the cathode tab are non-overlapping along a second coordinate axis perpendicular to a length of the anode tab and perpendicular to the first coordinate axis.

11. The stacked-electrode battery cell of any of examples 8 through 10, wherein the first bond region and the second bond region of at least one of the anode tab or the cathode tab are non-overlapping along a plurality of coordinate axes perpendicular to the first coordinate axis.

12. The stacked-electrode battery cell of any of examples 8 through 11, wherein the stacked electrode battery cell is a lithium-ion battery cell.

13. The stacked-electrode battery cell of any of examples 8 through 12, wherein the anode and cathode are bonded to the anode tab in cathode tab, respectively, by ultrasonic welds.

14. The stacked-electrode battery cell of any of examples 8 through 13, wherein the each of the anode tab and cathode tab is elongate in a direction in which the first bond region and the second bond region do not overlap.

15. A method of fabricating a stacked-electrode battery cell, the method comprising: stacking a first plurality of flat electrodes along a first coordinate axis, all of the first plurality of flat electrodes collectively forming at least a portion of only a first one of an anode or a cathode of the battery cell; bonding a first electrode of the first plurality of flat electrodes to a first bond region of a first flat tab, the first flat tab being at least a portion of a first external connection terminal of the battery cell; and bonding a second electrode of the first plurality of flat electrodes to a second bond region of the first flat tab, wherein the first bond region and the second bond region of the first flat tab are non-overlapping along at least one coordinate axis perpendicular to the first coordinate axis.

16. The method of example 15, wherein the first bond region and the second bond region are non-overlapping along a second coordinate axis parallel to a length of the tab and perpendicular to the first coordinate axis.

17. The method of example 15 or example 16, wherein the first bond region and the second bond region are non-overlapping along a second coordinate axis perpendicular to a length of the tab and perpendicular to the first coordinate axis.

18. The method of any of examples 15 through 17, wherein the first bond region and the second bond region are non-overlapping along a plurality of coordinate axes perpendicular to the first coordinate axis.

19. The method of any of examples 15 through 18, wherein the tab is elongate in a direction in which the first bond region and the second bond region do not overlap.

20. The method of any of examples 15 through 19, further comprising: stacking a second plurality of flat electrodes along the first coordinate axis, all of the second plurality of flat electrodes collectively forming at least a portion of only a second one of the anode or the cathode of the battery cell; bonding a first electrode of the second plurality of flat electrodes to a first bond region of a second flat tab, the second flat tab being at least a portion of a second external connection terminal of the battery cell; and bonding a second electrode of the second plurality of flat electrodes to a second bond region of the second flat tab, wherein the first bond region and the second bond region of the second flat tab are non-overlapping along at least one coordinate axis perpendicular to the first coordinate axis.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A stacked-electrode battery cell comprising:
an external connection terminal including a flat tab; and
a plurality of flat electrodes stacked along a first coordinate axis, all of the electrodes collectively forming at least a portion of only one of an anode or a cathode of the battery cell, wherein a first electrode of the plurality of flat electrodes is bonded to a first bond region of the tab and a second electrode of the plurality of flat electrodes is bonded to a second bond region of the tab, and wherein the first bond region and the second bond region are non-overlapping along at least one coordinate axis perpendicular to the first coordinate axis.

2. The stacked-electrode battery cell of claim 1, wherein the first bond region and the second bond region are non-overlapping along a second coordinate axis parallel to a length of the tab and perpendicular to the first coordinate axis.

3. The stacked-electrode battery cell of claim 1, wherein the first bond region and the second bond region are non-overlapping along a second coordinate axis perpendicular to a length of the tab and perpendicular to the first coordinate axis.

4. The stacked-electrode battery cell of claim 1, wherein the first bond region and the second bond region are non-overlapping along a plurality of coordinate axes perpendicular to the first coordinate axis.

5. The stacked-electrode battery cell of claim 1, wherein the stacked electrode battery cell is a lithium-ion battery cell.

6. The stacked-electrode battery cell of claim 1, wherein the first and second electrodes are bonded to the tab by an ultrasonic weld.

7. The stacked-electrode battery cell of claim 1, wherein the tab is elongate in a direction in which the first bond region and the second bond region do not overlap.

8. A stacked-electrode battery cell comprising:
a first external anode connection terminal including a flat anode tab;
a second external cathode connection terminal including a flat cathode tab;
a plurality of flat anode electrodes stacked along a first coordinate axis, the plurality of flat anode electrodes collectively forming at least a portion of an anode of the battery cell, wherein a first anode electrode of the plurality of flat anode electrodes is bonded to a first bond region of the anode tab and a second anode electrode of the plurality of flat anode electrodes is bonded to a second bond region of the anode tab, and wherein the first bond region and the second bond region of the anode tab are non-overlapping along at least one coordinate axis perpendicular to the first coordinate axis;
a plurality of flat cathode electrodes stacked along the first coordinate axis, the plurality of flat cathode electrodes collectively forming at least a portion of a cathode of the battery cell, wherein a first cathode electrode of the plurality of flat cathode electrodes is bonded to a first bond region of the cathode tab and a second cathode electrode of the plurality of flat cathode electrodes is bonded to a second bond region of the cathode tab, and wherein the first bond region and the second bond region of the cathode tab are non-overlapping along at least one coordinate axis perpendicular to the first coordinate axis;
an exterior enclosure enclosing the plurality of anode electrodes, the plurality of anode electrodes, and a portion of each of the anode tab and the cathode tab; and
an electrolytic compound contained within the enclosure and immersing the plurality of anode electrodes and the plurality of anode electrodes.

9. The stacked-electrode battery cell of claim 8, wherein the first bond region and the second bond region of at least one of the anode tab or the cathode tab are non-overlapping along a second coordinate axis parallel to a length of the anode tab and perpendicular to the first coordinate axis.

10. The stacked-electrode battery cell of claim 8, wherein the first bond region and the second bond region of at least one of the anode tab or the cathode tab are non-overlapping along a second coordinate axis perpendicular to a length of the anode tab and perpendicular to the first coordinate axis.

11. The stacked-electrode battery cell of claim 8, wherein the first bond region and the second bond region of at least one of the anode tab or the cathode tab are non-overlapping along a plurality of coordinate axes perpendicular to the first coordinate axis.

12. The stacked-electrode battery cell of claim 8, wherein the stacked electrode battery cell is a lithium-ion battery cell.

13. The stacked-electrode battery cell of claim 8, wherein the anode and cathode are bonded to the anode tab in cathode tab, respectively, by ultrasonic welds.

14. The stacked-electrode battery cell of claim 8, wherein the each of the anode tab and cathode tab is elongate in a direction in which the first bond region and the second bond region do not overlap.

15. A method of fabricating a stacked-electrode battery cell, the method comprising:
stacking a first plurality of flat electrodes along a first coordinate axis, all of the first plurality of flat electrodes collectively forming at least a portion of only a first one of an anode or a cathode of the battery cell;
bonding a first electrode of the first plurality of flat electrodes to a first bond region of a first flat tab, the first flat tab being at least a portion of a first external connection terminal of the battery cell; and
bonding a second electrode of the first plurality of flat electrodes to a second bond region of the first flat tab, wherein the first bond region and the second bond region of the first flat tab are non-overlapping along at least one coordinate axis perpendicular to the first coordinate axis.

16. The method of claim 15, wherein the first bond region and the second bond region are non-overlapping along a second coordinate axis parallel to a length of the tab and perpendicular to the first coordinate axis.

17. The method of claim 15, wherein the first bond region and the second bond region are non-overlapping along a second coordinate axis perpendicular to a length of the tab and perpendicular to the first coordinate axis.

18. The method of claim 15, wherein the first bond region and the second bond region are non-overlapping along a plurality of coordinate axes perpendicular to the first coordinate axis.

19. The method of claim 15, wherein the tab is elongate in a direction in which the first bond region and the second bond region do not overlap.

20. The method of claim 15, further comprising:
stacking a second plurality of flat electrodes along the first coordinate axis, all of the second plurality of flat electrodes collectively forming at least a portion of only a second one of the anode or the cathode of the battery cell;

bonding a first electrode of the second plurality of flat electrodes to a first bond region of a second flat tab, the second flat tab being at least a portion of a second external connection terminal of the battery cell; and bonding a second electrode of the second plurality of flat electrodes to a second bond region of the second flat tab, wherein the first bond region and the second bond region of the second flat tab are non-overlapping along at least one coordinate axis perpendicular to the first coordinate axis.

* * * * *